United States Patent
Stuart (10) Patent No.: US 7,218,850 B2
(45) Date of Patent: May 15, 2007

(54) APPARATUS AND METHOD FOR MONITORING SIGNAL-TO-NOISE RATIO IN OPTICAL TRANSMISSION SYSTEMS

(75) Inventor: Howard Roy Stuart, East Windsor, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 684 days.

(21) Appl. No.: 10/636,385

(22) Filed: Aug. 7, 2003

(65) Prior Publication Data
US 2005/0031341 A1    Feb. 10, 2005

(51) Int. Cl.
*H04B 10/08* (2006.01)
*H04B 10/06* (2006.01)
*H04B 10/148* (2006.01)

(52) U.S. Cl. .......................... 398/26; 398/202; 329/306
(58) Field of Classification Search ................ 398/26, 398/202; 375/235; 329/304–307
See application file for complete search history.

(56) References Cited

U.S. PATENT DOCUMENTS

| | | | | |
|---|---|---|---|---|
| 3,035,231 A | * | 5/1962 | Woods et al. .............. | 329/323 |
| 4,466,108 A | * | 8/1984 | Rhodes ....................... | 375/329 |
| 5,881,107 A | * | 3/1999 | Termerinac et al. ........ | 375/279 |
| 6,775,521 B1 | * | 8/2004 | Chen ....................... | 455/67.11 |

* cited by examiner

*Primary Examiner*—Leslie Pascal (57) ABSTRACT

A high-sensitivity signal-to-noise ratio (SNR) determining apparatus measures the in-band SNR of an optical data signal by detecting and demodulating the optical signal and analyzing a narrow bandwidth of the resulting electrical data spectrum at half the data clock frequency, or more generally, a predetermined frequency equal to a multiple M of one-half the clock frequency, $f_{clk}/2$, where M is an integer equal to or greater than one, may be used. When the optical signal is a WDM signal, a tunable filter isolates a single channel for detection. The detected electrical signal is subjected to both an in-phase and quadrature narrowband RF demodulation using a local oscillator at precisely half the clock frequency. Using this technique, the magnitude of the data portion of the optical signal becomes the in-phase component and the magnitude of the noise present in the optical signal becomes the quadrature component. The ratio of the two demodulated signal components (in-phase and quadrature) is proportional to the SNR of the detected signal. The technique is inherently narrowband and offers very high sensitivity and does not require an optical pre-amplifier.

21 Claims, 6 Drawing Sheets

APPARATUS AND METHOD FOR MONITORING SIGNAL-TO-NOISE RATIO IN OPTICAL TRANSMISSION SYSTEMS

TECHNICAL FIELD OF THE INVENTION

This invention relates generally to optical transmission systems and, more particularly, to a method and apparatus for monitoring signal-to-noise ratio in optical transmission systems.

BACKGROUND OF THE INVENTION

Performance monitoring is an integral aspect of optical networking, being used for both quality assurance and fault localization. While quality assurance monitoring can be confined to the end-terminal, effective fault localization requires that monitoring be done at many locations throughout the network. In the past, this monitoring was done only at OEO (optical-electrical-optical) regeneration sites, where the optical signals were converted back to electrical signals, cleaned up, and then retransmitted optically. The OEO conversion process enabled full access to the data signal in the electrical regime, making performance monitoring straightforward. As optical networks evolve, however, a greater degree of optical transparency is being realized. Examples of this are the emergence of ultra-long haul optical transport and large-scale optical switching. As the degree of optical transparency within networks increases, the distance between OEO sites in the network is increasing, and new methods of performance monitoring (not confined to OEO sites) will be needed to insure effective fault localization.

One technique for optical performance monitoring is optical spectral analysis. This technique is commonly used in wavelength division multiplexed (WDM) transmission systems. A small portion (~1–5%) of the total optical power being transmitted in the fiber is tapped and sent to an optical spectrum analyzer. The analyzer measures the optical power as a function of wavelength, and thus provides information on the presence or absence of specific WDM channels and their respective power levels. In addition, the regions of the spectrum lying between the channels can be used to derive an estimate of the optical noise present in the system, providing a per-channel measurement of the optical signal-to-noise ratio (OSNR) present in the system.

The OSNR measurement provided by spectral analysis has several important limitations. For high spectral efficiency WDM systems, the optical power measured at the inter-channel wavelengths will contain power from the spectral tails of the adjacent channels, and will not enable measurement of the inherent optical noise floor. In addition, if there are optical add-drop filters present throughout the system, the optical noise measured at the inter-channel wavelengths will not necessarily reflect the in-band optical noise floor. Finally, this measurement is not sensitive to purely in-band noise sources, or to pulse-distortion effects arising from dispersion and fiber nonlinearities that may also adversely affect signal quality.

An emerging technology aimed at addressing these limitations is the reference-receiver Q-monitor (eye-diagram analysis). One such technique is described by W. G. Yang, "Sensitivity issues of optical performance monitoring", IEEE Phot. Tech. Lett. 14, 107–109 (2002). In this approach, a small portion (again 1–5%) of the optical signal is tapped and sent through a tunable filter to a conventional full-bit-rate receiver. The tunable filter is capable of isolating a single WDM channel, and can be tuned to receive any of the channels being transmitted through the system. The receiver performs full clock and data recovery and can provide detailed information about the quality of the channel. This is done either using format/protocol specific techniques (such as examining SONET parity bits, or looking at the output of forward error correction [FEC] chips) or using a format independent eye-diagram analysis technique.

The main limitations of the reference-receiver approach involve both sensitivity and cost. Because only a small portion of the total optical power is available for detection, and because a conventional wideband receiver is required, the inherent receiver noise places severe limits on the sensitivity of the monitor. This problem can be alleviated by placing an optical pre-amplifier in front of the monitor. However, this adds significant cost. In addition, high-speed optical transmission systems are often designed such that the signal pulses are intentionally broadened by chromatic dispersion throughout network (to reduce the penalties of optical nonlinearities). In that case, the reference-receiver may require dispersion compensation of the signal prior to detection. This also adds significant cost. For any performance monitoring solution, an increase in cost will result in fewer monitors being placed throughout the network, which will reduce the effectiveness of the fault localization.

SUMMARY OF THE INVENTION

The present invention overcomes the prior problems and provides a high-sensitivity technique for measuring the in-band signal-to-noise ratio (SNR) of an optical data signal. My SNR determining apparatus detects and demodulates the optical signal and analyses a narrow bandwidth of the resulting electrical data spectrum at half the data clock frequency. A small portion of the optical signal present in the fiber is tapped and detected, and the detected electrical signal is subjected to both an in-phase and quadrature narrowband RF demodulation using a local oscillator at precisely half the clock frequency. While a preferred embodiment uses the one-half clock frequency, $f_{clk}/2$, more generally, a predetermine frequency equal to a multiple M of one-half the clock frequency, $f_{clk}/2$, where M is an integer equal to or greater than one, may be used. When the optical signal is a WDM signal, a tunable filter isolates a single channel for detection. Using this technique, the data portion of the signal can be isolated along one dimension of the recovered phase space. The magnitude of the detected signal along the orthogonal axis of the phase-space is proportional to the noise present in the channel. The ratio of the two demodulated signals (in-phase and quadrature) is then proportional to the SNR of the detected signal. As this technique is inherently narrowband, it offers very high sensitivity and will not require an optical pre-amplifier.

In addition, narrowband detector front-end electronics can be used to further improve the sensitivity. The technique also provides some immunity to chromatic dispersion: the measurement is sensitive to changes in SNR even in the presence of some amount of chromatic dispersion. In addition, a change in the amount of dispersion present on the signal also produces a change in the measured quantity. The measurement can therefore also serve as a monitor of signal distortion.

In accordance with the present invention, a SNR determining apparatus for determining the SNR of a modulated optical signal comprises a demodulator for detecting and demodulating a received optical signal that is randomly modulated at a clock frequency $f_{clk}$, the demodulation being performed within a narrow bandwidth around a predetermine frequency equal to a multiple M of one-half the clock frequency, $f_{clk}/2$, where M is an integer equal to or greater than one, and signal processing means for determining the SNR by taking the ratio of the power level of the in-phase component, I, of the demodulated signal to the quadrature-phase component, Q, of the demodulated signal.

My SNR determining apparatus may be used to detect and demodulate either return-to-zero (RZ) or non-return-to-zero (NRZ) signals at half the data clock frequency. In another embodiment, my SNR determining apparatus may be used to detect and demodulate RZ signals using the data clock frequency.

BRIEF DESCRIPTION OF THE DRAWINGS

The present invention will be more fully appreciated by consideration of the following Detailed Description, which should be read in light of the accompanying drawing in which:

FIG. 3 illustratively shows Constellation diagrams (I vs. Q) resulting from narrowband RF demodulation of a randomly modulated 10 Gbit/sec RZ data stream.

In the following description, identical element designations in different figures represent identical elements. Additionally in the element designations, the first digit refers to the figure in which that element is first located (e.g., 602 is first located in FIG. 6).

DETAILED DESCRIPTION

Figure 1A:
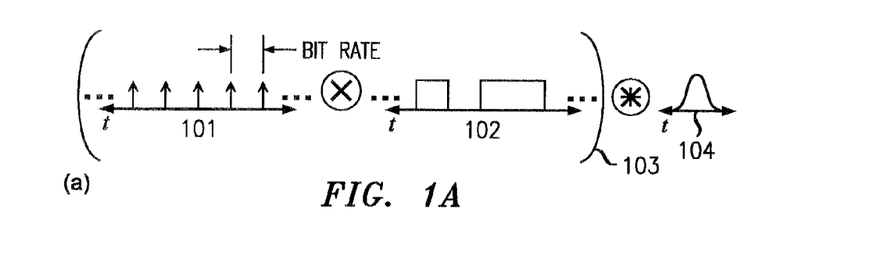
FIG. 1A illustrates a time-domain construction of a randomly modulated return-to-zero (RZ) data spectrum and FIG. 1B shows the frequency-domain representation of signal construction of FIG. 1A.
Figure 1B:
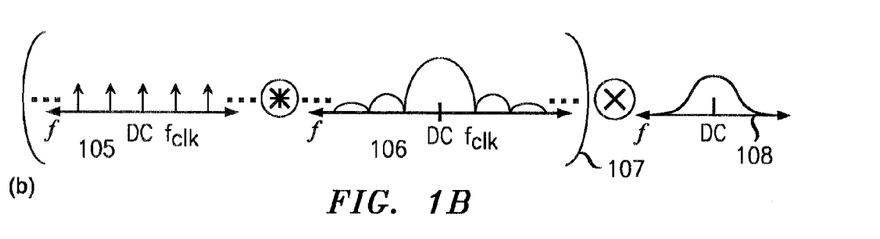

First consider the electrical spectrum of a randomly modulated periodic data signal. Shown in FIG. 1A is the time-domain representation of an on-off keyed return-to-zero (RZ) electrical data signal. FIG. 1A is just a mathematical deconstruction of the RZ data signal which is used to illustrate the presence of the various symmetries of the spectrum. Here the carrier signal is described as an infinite periodic sequence of delta functions 101 (with a period equal to the bit-rate) multiplied by the randomly modulated periodic data signal 102 (represented as 1 during the on-bits and 0 during the off-bits). The result is a sequence of modulated delta functions 103 which is then convolved with the pulse-shape 104 to produce the conventional RZ data signal (not shown). Shown in FIG. 1B is the frequency-domain representation (Fourier transform) of the time-domain representation of FIG. 1A. As shown, an infinite periodic array of delta functions 105 (at DC and multiples of the clock frequency, $f_{clk}$) are convolved with the frequency-domain power spectrum 106 of the random non-return-to-zero (NRZ) data signal 102. The spectrum resulting from this convolution 107 is then multiplied by the spectrum of the pulse-shape 108 to produce the spectrum of the RZ-modulated signal (not shown).

The elements of the convolution 107, shown in the parenthesis of FIG. 1B, have two notable symmetries. The first term of the convolution 105 has translational symmetry at the clock period $f_{clk}$; the second term 106 has conjugate symmetry about DC. It is easily verified that the spectrum resulting from the convolution retains the translational symmetry, i.e. the spectrum appearing about each clock delta-function will be identical. It is also clear that the resulting spectrum will have conjugate symmetry about the clock delta-functions. Taken together, these two symmetries imply one further symmetry: conjugate symmetry about frequencies located at precisely the mid-point between two delta-functions, i.e., at half the bit rate 101 and half the clock frequency $f_{clk}$.

The symmetries present in the convolved spectrum are strictly present only for a randomly modulated periodic sequence of delta functions. In FIG. 1B, the last step in construction of the RZ data spectrum is to multiply the convolved spectrum 107 by the spectrum of the pulse-shape 108. The pulse shape 108 only has one symmetry point: DC. Thus the only remaining symmetry point in the final spectrum (107 convolved with 108, not shown) is also at DC; the pulse spectral envelope 105 breaks the symmetries at all other points. However, the degree of the symmetry breaking will be relatively small at the half-clock frequency ($f_{clk}/2$), particularly if we restrict the region of consideration to a narrow bandwidth about $f_{clk}/2$. Within this narrow bandwidth, the half-clock frequency $f_{clk}/2$ retains approximately a conjugate symmetry. Likewise, at all multiple M of the half-clock frequency $f_{clk}/2$ (where M is an integer equal to or greater than 1), the approximate conjugate symmetry is retained within very narrow bandwidths about these frequencies.

In accordance with my inventive SNR determining apparatus (also referred to herein as a SNR monitor), I exploit this conjugate symmetry property to measure SNR. In any SNR measurement technique, it is necessary to first obtain independent measurements of the signal and the noise. The data signal 102 is randomly modulated, and this presents a problem: if both the signal and noise are random, how does one obtain independent measurements of each? A conventional receiver does this using clock-and-data-recovery (CDR): the receiver circuit phase-locks to the incoming data signal, and it can then distinguish between the zeros and the ones. Once the zeros and ones have been separated, it can independently measure the noise on each, and thus derive the SNR. However, the data recovery process is inherently wideband, and is therefore not very sensitive.

Figure 2:
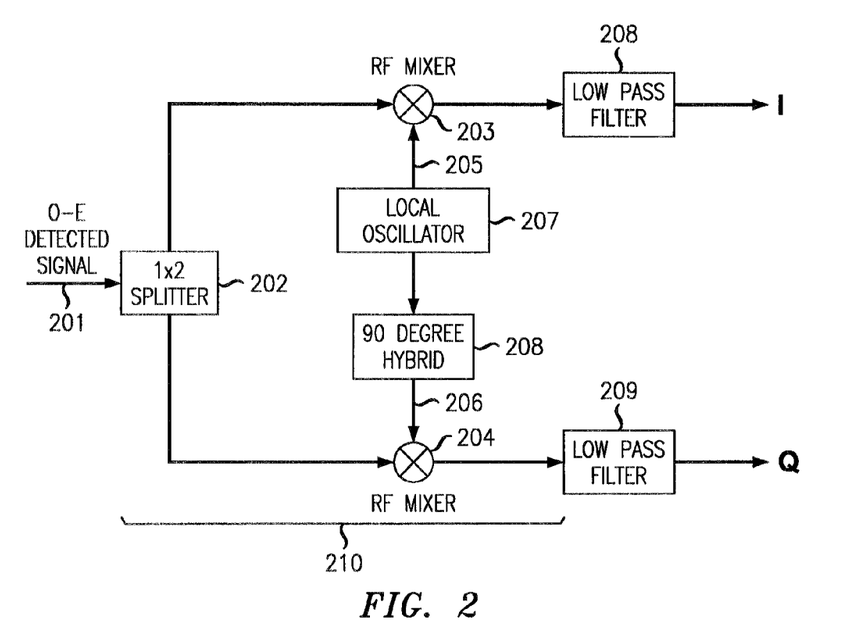
FIG. 2 illustrates an I/Q demodulation circuit required to separate signal and noise at the half-clock frequency.

I have found that by using the conjugate symmetry point at the half-clock frequency $f_{clk}/2$, I can isolate the signal and noise components within a narrow bandwidth at this frequency. I exploit the property that the Fourier transform of a complex signal with conjugate symmetry will be purely real. Thus, when an RF demodulation is done at precisely the half-clock frequency, the resulting demodulated signal will appear along a single axis in the phase-space recovered by the RF demodulation. With reference to FIG. 2, I describe a circuit required to accomplish the RF demodulation. FIG. 2 shows a standard I/Q RF demodulation circuit which I have adapted to use a local oscillator 207 at half-clock frequency $f_{clk}/2$. The optical signal is detected and the resulting electrical signal 201 is split, in splitter 202, and sent to two RF mixers 203 and 204. The signal is mixed with two versions 205 and 206 of the local oscillator differing by a 90 degree phase shift. In FIG. 2 the signal 206 is shifted using phase shifter 208 The outputs of the two mixers 203 and 204are low-pass filtered, using filters 209 and 210, yielding the in-phase (I) and quadrature (Q) components of the signal at the local oscillator frequency.

Figure 3A:
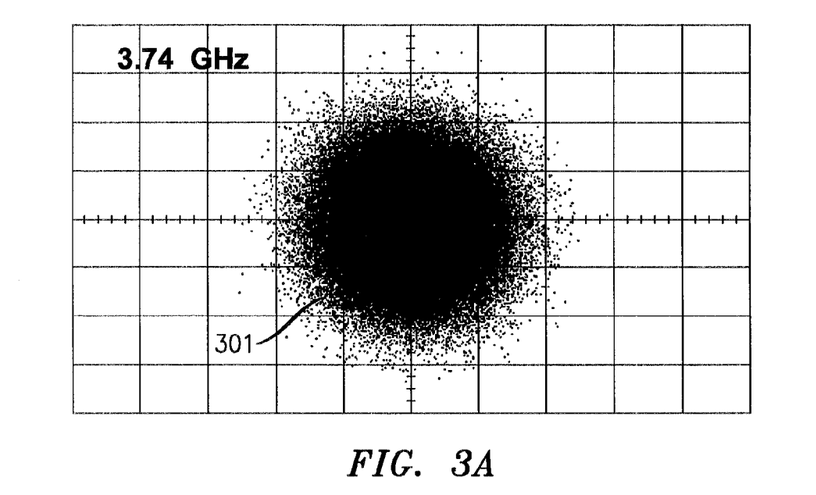
FIG. 3A shows the Local oscillator frequency 3.74 GHz.
Figure 3B:
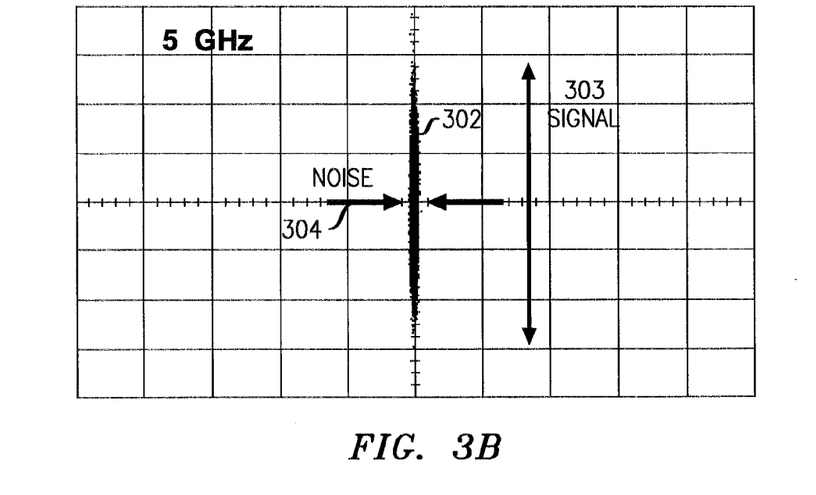
FIG. 3B shows the Local oscillator frequency 5 GHz (precisely half the data clock frequency).

FIG. 3 shows illustrative measured constellation diagrams resulting from such RF mixing performed on a 10 Gbit/sec RZ-modulated random data stream. (The constellation diagrams are constructed by plotting I vs. Q for a given set of data.) FIG. 3A shows the constellation 301 resulting when the local oscillator is set to a random frequency, e.g., 3.74 GHz. In FIG. 3A, as expected from the randomness of the data, the resulting constellation 301 is isotropically random in phase space. FIG. 3B shows in accordance with my invention, the constellation 302 resulting when the local oscillator is set to precisely half the data clock frequency, $f_{clk}/2$, i.e., 5 GHz. Here the constellation collapses into a single dimension in phase space (a line), 302, as a result of the conjugate symmetry present at $f_{clk}/2$. If we assume that the noise present in the received channel is isotropic within the phase space, we can derive the SNR by taking the ratio of the length 303 of the line 302 to its width 304. If we further assume that the SNR measured at the half-clock frequency is indicative of the overall SNR for the broadband channel (as is the case for the broadband noise source most often present in optical transmission systems: amplified spontaneous emission), we have then arrived at an estimate of the channel SNR.

It should be noted here that the conjugate symmetry exists at all multiples M of the half-clock frequency $f_{clk}/2$. The technique described here can therefore be implemented at any of these predetermined frequencies. For example, demodulating at 10 GHz (the clock frequency) would also produce a line 302 in the recovered phase space, due to the presence of a symmetry point at 10 GHz. This would, however, occur only for RZ data signals. For the case of non-return-to-zero (NRZ) data modulation, there is a null in the spectrum at the clock frequency; thus for NRZ type data signals it is preferable to demodulate at the half-clock frequency. Demodulating at any multiple of the clock frequency would produce a line 302 in the recovered phase space for RZ data signals. Likewise, demodulating at any half-multiple of the clock frequency would produce a line 302 for both RZ and NRZ data signals. As the magnitude of the signal power decreases at higher frequencies, it is generally preferable to operate at the lowest multiple (the half-clock).

Returning to our half-clock frequency example, note that because of the symmetry-breaking property of the non-zero pulse width, the SNR measurement is restricted to narrow bandwidths about the half-clock point. Widening the detected bandwidth increases the degree of asymmetry in the detected spectrum, reducing the dynamic range of the measurement (as the spectral asymmetry causes some signal power to leak into the orthogonal dimension). Also note that this technique is applicable to both RZ and NRZ modulated data streams. For NRZ, the pulse shape 104 shown in FIG. 1(a) is replaced by a rect-function with a width equal to the bit period. This has the effect of increasing the slope of the pulse spectral envelop at the half-clock point, increasing the degree of symmetry breaking. While this reduces the dynamic range of the measurement, the effect can be countered by further reducing the low-pass filter 208, 209 bandwidths at the output of the I/Q demodulator.

Figure 4:
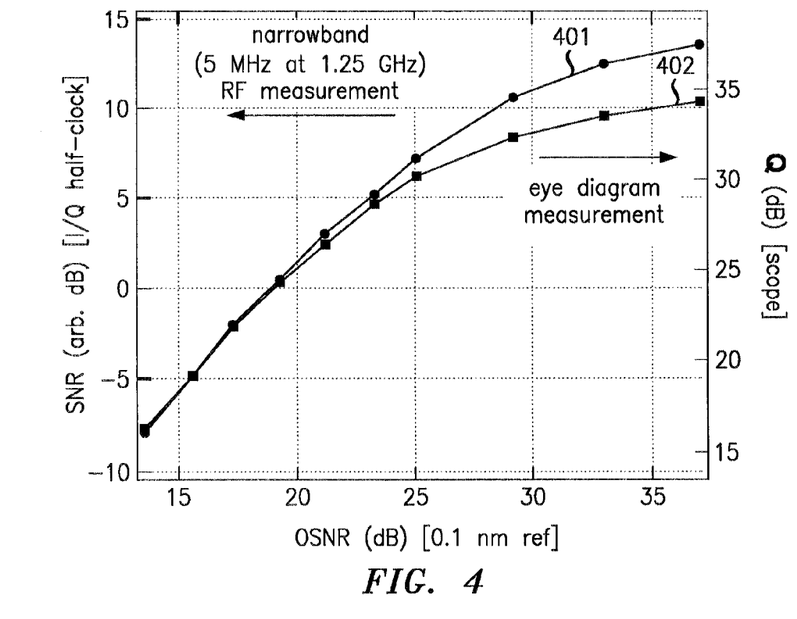
FIG. 4 illustrates the Measured SNR vs. OSNR for two measurement techniques: narrowband I-Q demodulation at the half-clock frequency (circles) and conventional eye diagram analysis using a high-speed sampling oscilloscope (squares).

The effectiveness of the SNR measurement is demonstrated by the experimental data shown in FIG. 4. In this experiment, a random RZ-modulated optical data signal was generated at 2.5 Gbits/sec. The OSNR of this signal was varied using an attenuator and an optical amplifier. The optical signal was then detected, and the resulting electrical signal was analyzed using the circuit shown in FIG. 2 with the local oscillator 207 set to precisely half the data clock frequency (1.25 GHz) and phase-locked to the incoming data stream. The phase of the local oscillator 207 was adjusted such that the signal component was isolated entirely in one of the I-Q output paths of FIG. 2. The low pass filters 208 and 209 have a 5 MHz bandwidth. The two resulting 5 MHz bandwidth I-Q signals were converted into digital signals for analysis by a computer. The analysis consisted of squaring and averaging (for 200 msec) the two signals, and then taking the ratio of the value produced by the signal channel to that produced by the orthogonal channel. The results of this narrowband SNR measurement 401 are plotted in FIG. 4 as a function of OSNR. In addition, the SNR measurement 402 of the received electrical signal was measured using conventional eye-diagram analysis on a high-speed sampling oscilloscope for comparison. As is seen in the figure, the narrowband measurement 401 compares favorably with the conventional broadband measurement 402. Note that for the narrowband technique the signal and noise paths undergo different degrees of amplification, such that the resulting SNR values 401 differ from the actual SNR values 402 by an arbitrary scaling factor (~24 dB, as determined by comparing the right and left axes of FIG. 4).

Figure 5:
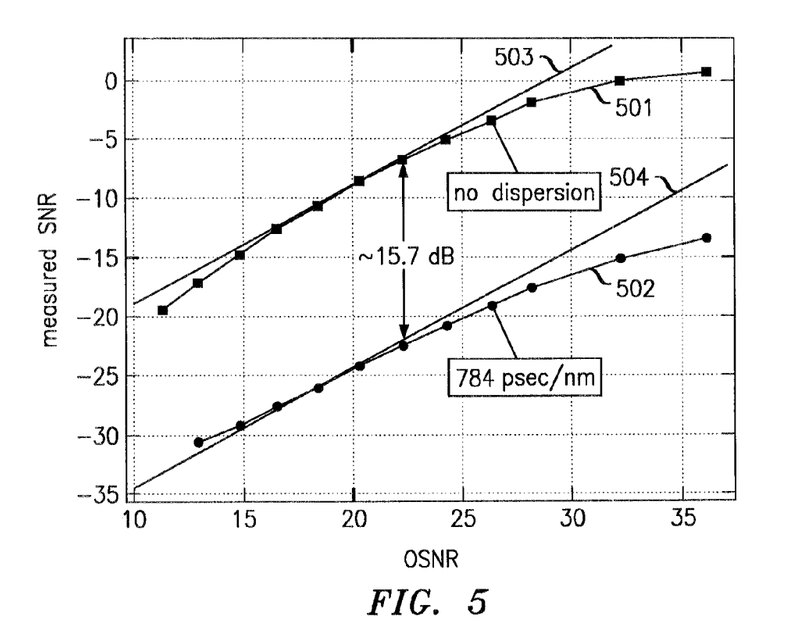
FIG. 5 illustrates the performance of the narrowband SNR measurement in the presence of dispersion. The data rate is 10 Gbits/sec. Lines with a slope of one are shown adjacent to the two data curves for comparison.

FIG. 5 demonstrates the performance of my technique in the presence of chromatic dispersion. In this example, the data rate of the RZ-modulated signal is 10 Gbit/sec. The previously described narrowband half-clock measurement is performed on the detected signal for two cases: no dispersion 501 and 784 psec/nm of dispersion 502. Note that even in the presence of dispersion 502, the measured values of SNR closely track the variation in OSNR (lines 503 and 504 with a slope of one are shown adjacent to the dispersion 501 and no dispersion 502 curves for comparison). In addition, the presence of the dispersion results in a ~15.7 dB decrease in the measured value of the SNR. Thus the measurement is simultaneously sensitive to signal degradations resulting from both noise and pulse distortion.

Figure 6:
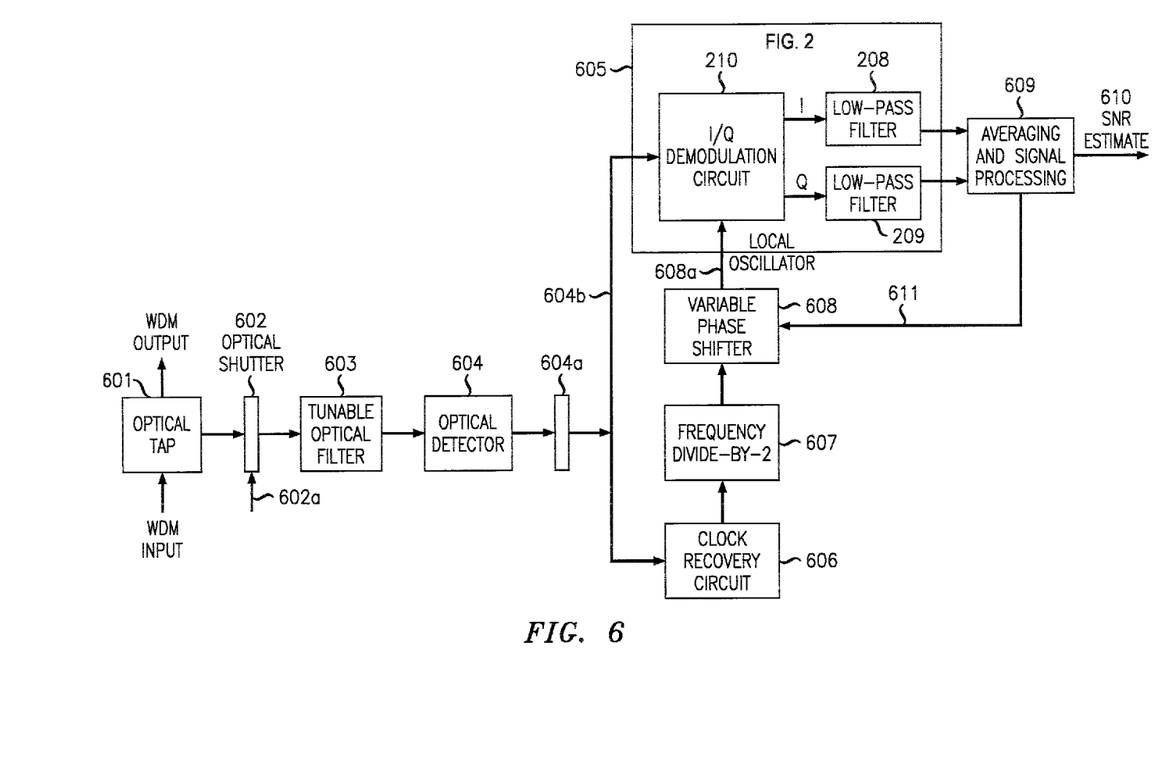
FIG. 6 shows a first embodiment of the present invention.

Shown in FIG. 6 is a first embodiment of the invention, as it would be implemented in an actual optical network. A small fraction of the WDM input power transmitted in the WDM system is tapped by optical tap 601 and passed through optical shutter 602 and tunable optical filter 603 to isolate a single data channel. An optical shutter 602 is included to assist in amplifier noise calibration or chopping, as described below. This data channel is then converted to an electrical signal through an optical detector 604 and amplified using amplifier 604a. The electrical signal 604b is routed to two circuits: the I/Q demodulation unit 605 described previously in FIG. 2, and also to a clock recovery circuit 606. The clock recovery circuit 606 generates a sine wave at the clock frequency of data channel that is phase-locked to the incoming data channel. This sine wave is then passed through a frequency divide-by-two circuit 607, which generates the half-clock local oscillator signal is used by the I/Q demodulator unit 605. In I/Q demodulator unit 605, the outputs of the I/Q demodulator 210 are filtered by low-pass filters 208 and 209 and fed to an averaging and processing circuit 609 that produces the measured value of SNR 610. A variable phase-shifter 608 is included in the local oscillator signal path to allow the phase of the local oscillator signal 608a to be optimized such that the signal power is purely isolated in one of the I/Q demodulation output paths I or Q. The phase-shifter 608 is controlled by a feedback signal 611 provided by the signal processing circuit 609. The phase-shifter 608 is optimized so as to minimize the power measured in the noise output path; this will maximize the dynamic range of the SNR measurement. The signal processing circuit 609 is a well known design which converts the filtered demodulated voltage input signals to power measurements (by squaring them), averaging, and subtracting out any background signals originating from amplifier noise or offsets. Because this is a narrowband measurement technique, the measurement will be possible even when the intrinsic signal-noise level (to be measured) is substantially below the noise level present in the optoelectronic receiver 604 front end. By averaging, these noise components are converted to DC values. If the amplifier 604a noise power is known (and it can be measured by periodically blocking the incoming light signal with shutter 602), it can be subtracted. Equivalently, the shutter 602 can operate at several tens or hundreds of hertz, under control of signal processor circuit 609, and conventional lock-in detection techniques can be used by signal processor 609 to measure the low signal and noise power levels. Using the signal power and noise power measurements, signal processing circuit 609 generates SNR estimate 610.

Because of the narrowband nature of this measurement, the input optical power level from tap 601 can be made extremely small, eliminating the need for an optical pre-amplifier. In addition, the optoelectronic front-end 604 and all electronic circuitry need only operate well at frequencies around the half-clock frequency, (as well as any other frequencies required by the clock-recovery circuit 606). Thus for amplifier 604a, a resonant enhanced transimpedance amplifier design can be employed to enhance receiver sensitivity, and RF amplifier requirements are substantially relaxed, reducing cost.

Note that while FIG. 6 was described as being used with a input WDM signal, it could also be used with a single modulated optical wavelength input signal. In such an arrangement, the tunable optical filter 603 would not be needed since the input signal has only one wavelength.

Figure 7:
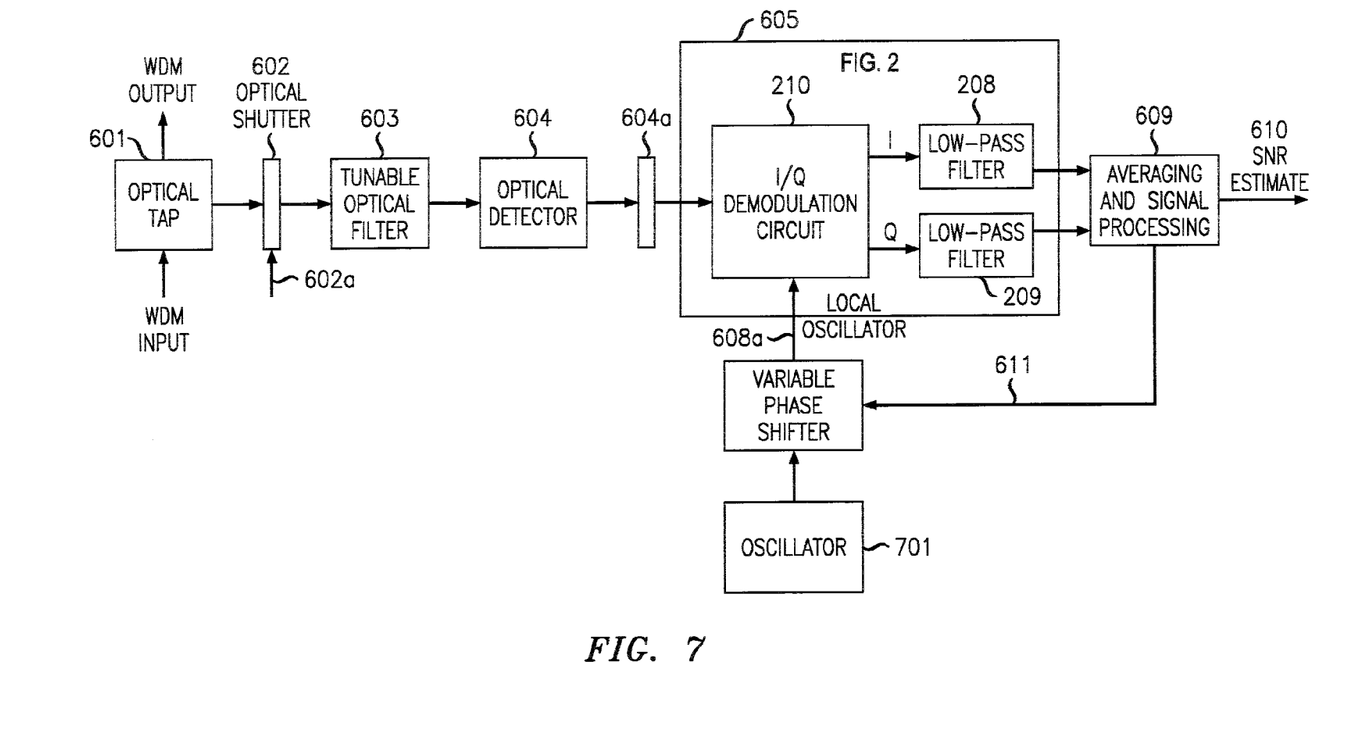
FIG. 7 shows a second embodiment of the present invention.

The presence of clock recovery circuit 606 may add some additional requirements, particularly regarding the minimum received optical power. Shown in FIG. 7 is an alternative embodiment that does not require a conventional clock recovery circuit 606. This embodiment resembles the FIG. 6 embodiment, except that a free-running local oscillator 701 is present in the monitor. The frequency of local oscillator 701 is set as close as possible to the half-clock frequency. As protocol dependent WDM data rates (WDM input) are typically specified with very tight tolerances, it should be possible to closely approach the actual channel data clock frequency using components similar to those used in standard transmitters (along with a divide-by-2 circuit). A variable phase-shifter 608 is again included, and a feedback signal 611 from the signal processing circuit 609 is used to control the phase of the local oscillator signal 608a. By continually adjusting the value of the phase shifter 608 (using feedback signal 611) so as to minimize the power present in the noise-channel of the demodulator 605 output, the local oscillator 701 will effectively be phase-locked to the incoming WDM data signal.

Figure 8:
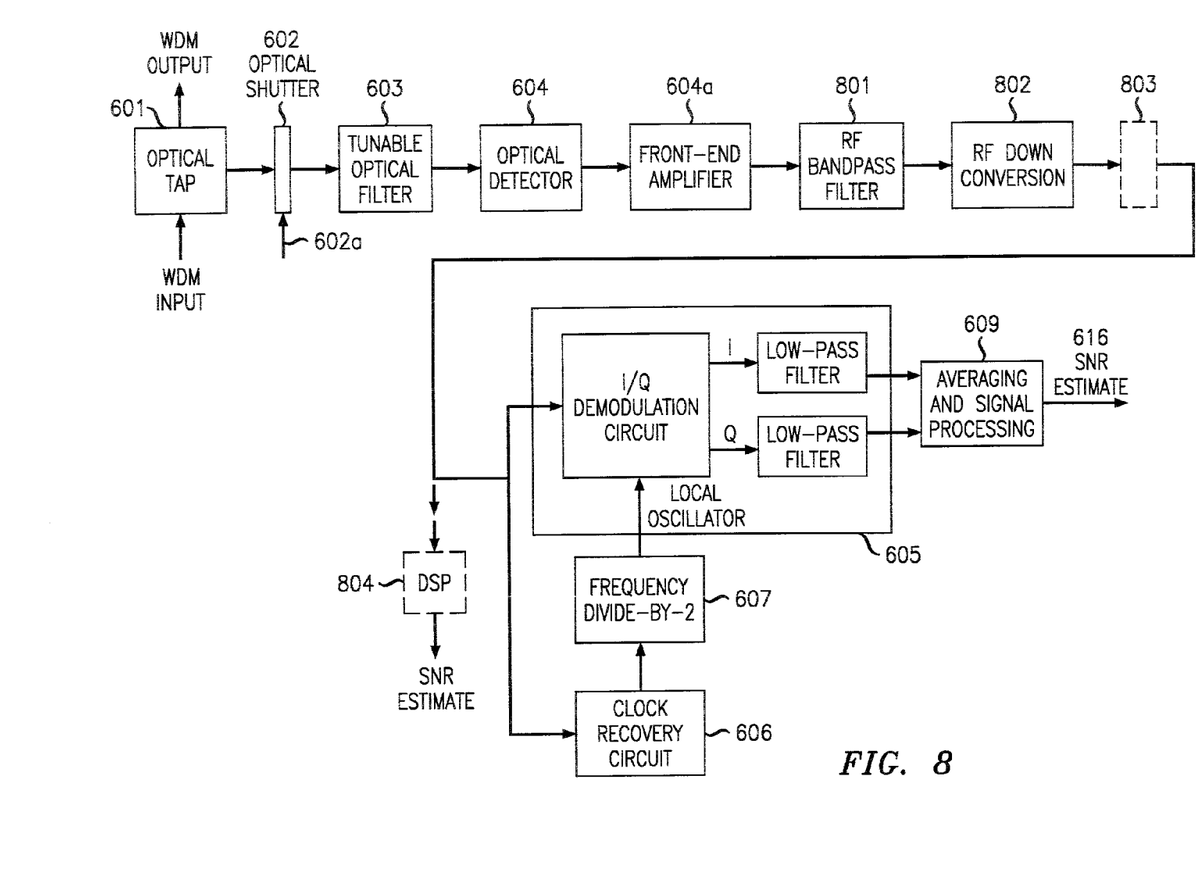
FIG. 8 shows a third embodiment of the present invention.

FIG. 8 shows a third embodiment of my invention. In this embodiment, the operations of circuits 601–604a operate in the same manner as described previously for FIG. 6. In this case, an RF bandpass filter 801 centered in the general vicinity of the half-clock frequency is placed directly after the front-end amplifier 604a. The bandwidth of this filter 801 is narrow as compared to the center frequency (~10–100 MHz in bandwidth) and the center frequency is chosen such that the half-clock point will fall somewhere within the passband. Following the filter 801, an RF converter 802 performs RF down conversion to shift the modulated signal to a lower frequency (for example, <100 MHz). At this lower modulation signal frequency, all previously described operations of 605–607, and 609, including the clock recovery and I-Q demodulation, are performed at lower frequencies. This embodiment has the advantage of not requiring these operations to be performed at the higher frequencies, thereby reducing the cost and improving the performance of the SNR monitor. In an alternative embodiment (shown in dotted lines in FIG. 8), an analog-to-digital (A/D) converter 803 is placed directly following the RF down conversion (with appropriate filtering following the down conversion to insure that there will be no aliasing in the A/D conversion). The clock recovery and I-Q demodulation to obtain the SNR estimate can then be done entirely by digital signal processing techniques using DSP 804, shown in dotted lines in FIG. 8, rather than by using the analog circuits 605–607, and 609. It should be noted that the RF bandpass filter 801, RF converter 802, and A/D converter 803 and DSP 804 can be used with the FIG. 7 embodiment.

Various modifications of this invention will occur to those skilled in the art. Nevertheless all deviations from the specific teachings of this specification that basically rely upon the principles and their equivalents through which the art has been advanced are properly considered within the scope of the invention as described and claimed.

I claim:

1. Apparatus for determining a signal-to-noise ratio, SNR, of an optical signal modulated with data at a clock frequency $f_{clk}$, comprising:

a demodulator adapted to electrically detect and demodulate said optical signal, the demodulation being performed within a narrow bandwidth around a frequency equal to one-half the clock frequency, $f_{clk}/2$, or a frequency that is offset from $f_{clk}/2$ by $Mf_{clk}/2$, where M is an integer equal to or greater than one, and signal processing means adapted to determine the SNR by taking a ratio of the power level of the in-phase component, I, of the demodulated signal and the power level of the quadrature-phase component, Q, of the demodulated signal.

2. The SNR determining apparatus of claim 1, wherein the demodulator includes low pass filters for limiting the demodulated signal components I and Q to within said narrow bandwidth.

3. The SNR determining apparatus of claim 1, wherein the demodulator comprises:

a splitter adapted to generate first and second copies of the electrically detected signal;

a local oscillator adapted to generate a local-oscillator signal having the frequency $f_{clk}/2$ or the frequency that is offset from $f_{clk}/2$ by $M_{clk}/2$;

a phase shifter adapted to shift the phase of the local-oscillator signal by 90 degrees;

a first mixer adapted to mix the first copy with the local-oscillator signal;

a second mixer adapted to mix the second copy with the phase-shifted local-oscillator signal;

a first low-pass filter adapted to filter the mixed signal generated by the first mixer, wherein the filtered signal produced by the first low-pass filter represents the in-phase component, I; and a second low-pass filter adapted to filter the mixed signal generated by the second mixer, wherein the filtered signal produced by the second low-pass filter represents the quadrature-phase component, Q.

4. The SNR determining apparatus of claim 3, wherein the local oscillator comprises:

a clock recovery circuit adapted to recover the clock frequency $f_{clk}$ from the electrically detected signal; and a frequency divider adapted to divide by two the recovered clock frequency to generate the frequency $f_{clk}/2$, wherein the local-oscillator signal has the frequency $f_{clk}/2$.

5. The SNR determining apparatus of claim 4, further comprising a variable phase shifter adapted to adjust the phase of the local-oscillator signal under control of the signal processing means so as to minimize the amplitude of the Q component.

6. The SNR determining apparatus of claim 1, further comprising:

an optical shutter adapted to periodically block said optical signal, wherein the signal processing means is adapted to apply lock-in detection referenced to the blocking frequency of the optical shutter to determine the SNR from the I and Q components.

7. The SNR determining apparatus of claim 1, wherein said narrow bandwidth is about 0.2% of $f_{clk}$.

8. The SNR determining apparatus of claim 1, wherein said optical signal is a component of a wavelength division multiplexed (WDM) signal, the apparatus further comprising:

an optical filter adapted to select a single wavelength channel of the WDM signal that corresponds to said optical signal, said optical filter being adapted to extract said optical signal from the WDM signal for the electrical detection and demodulation.

9. The SNR determining apparatus of claim 1, wherein said optical signal is a return-to-zero (RZ) signal.

10. The SNR determining apparatus of claim 1, wherein said optical signal is a non-return-to-zero (NRZ) signal.

11. The SNR determining apparatus of claim 1, further comprising:

an RF bandpass filter adapted to select said narrow bandwidth around a center frequency of the electrically detected signal, an RF converter adapted to down-convert the frequency of the electrically detected signal to a lower frequency, an analog-to-digital, A/D, circuit adapted to convert the lower frequency signal into a digital signal, wherein the signal processing means comprises a digital signal processor adapted to process the digital signal in the digital domain to determine the SNR.

12. A method for determining a signal-to-noise ratio, SNR, of an optical signal modulated with data at a clock frequency $f_{clk}$, comprising the steps of:

electrically detecting said optical signal;

demodulating the electrically detected signal within a narrow bandwidth around a frequency equal to one-half the clock frequency, $f_{clk}/2$, or a frequency that is offset from $f_{clk}/2$ by $Mf_{clk}/2$, where M is an integer equal to or greater than one; and determining the SNR by taking a ratio of the power level of the in-phase component, I, of the demodulated signal and the power level of the quadrature-phase component, Q, of the demodulated signal.

13. The method of claim 12, wherein said narrow bandwidth is about 0.2% of $f_{clk}$.

14. The method of claim 12, wherein said optical signal is a component of a wavelength division multiplexed (WDM) signal, the method further comprising the step of:

selecting a single wavelength channel of the WDM signal that corresponds to said optical signal to extract said optical signal from the WDM signal for the electrical detection and demodulation.

15. The method of claim 12, further comprising:

selecting said narrow bandwidth around a center frequency of the electrically detected signal using an RF bandpass filter;

down-converting the frequency of the electrically detected signal to a lower frequency;

analog-to-digital converting the resulting lower frequency signal into a digital signal; and processing the digital signal in the digital domain to determine the SNR.

16. The method of claim 12, wherein the step of demodulating comprises:

splitting the electrically detected signal to generate its first and second copies;

generating a local-oscillator signal having the frequency $f_{clk}/2$ or the frequency that is offset from $f_{clk}/2$ by $Mf_{clk}/2$;

shifting the phase of the local-oscillator signal by 90 degrees;

mixing the first copy with the local-oscillator signal to generate a first mixed signal;

mixing the second copy with the phase-shifted local-oscillator signal to generate a second mixed signal;

low-pass filtering the first mixed signal to generate the in-phase component, I; and low-pass filtering the second mixed signal to generate the quadrature-phase component, Q.

17. The method of claim 16, wherein the step of generating comprises:

recovering the clock frequency $f_{clk}$ from the electrically detected signal; and dividing by two the recovered clock frequency to generate the frequency $f_{clk}/2$, wherein the local-oscillator signal has the frequency $f_{clk}/2$.

18. The method of claim 17, further comprising controllably adjusting the phase of the local-oscillator signal so as to minimize the amplitude of the Q component.

19. The method of claim 12, further comprising:

periodically blocking said optical signal; and applying, to the I and Q components, lock-in detection referenced to the blocking frequency to determine the SNR from the I and Q components.

20. The method of claim 12, wherein said optical signal is a return-to-zero (RZ) signal.

21. The method of claim 12, wherein said optical signal is a non-return-to-zero (NRZ) signal.

* * * * *